(12) United States Patent
Yang

(10) Patent No.: US 7,131,634 B2
(45) Date of Patent: Nov. 7, 2006

(54) SOLENOID VALVE

(75) Inventor: I-Jin Yang, Pyungtak-Si (KR)

(73) Assignee: Mando Corporation, Gyeonggi-Do (KR)

( * ) Notice: Subject to any disclaimer, the term of this patent is extended or adjusted under 35 U.S.C. 154(b) by 71 days.

(21) Appl. No.: 10/974,633

(22) Filed: Oct. 26, 2004

(65) Prior Publication Data

US 2006/0086919 A1    Apr. 27, 2006

(51) Int. Cl.
*F16K 31/02* (2006.01)
(52) U.S. Cl. .................................. 251/129.15
(58) Field of Classification Search ............ 251/129.15
See application file for complete search history.

(56) References Cited

U.S. PATENT DOCUMENTS

| 6,276,764 B1 | 8/2001 | Park ........................ 303/119.2 |
| 6,808,160 B1* | 10/2004 | Hayakawa et al. ..... 251/129.02 |
| 6,846,049 B1* | 1/2005 | Obersteiner et al. ..... 303/119.2 |
| 6,988,707 B1* | 1/2006 | Ahn ........................ 251/129.15 |
| 2002/0092998 A1* | 7/2002 | Torii et al. .............. 251/129.15 |
| 2004/0262559 A1* | 12/2004 | Shibata ................... 251/129.15 |
| 2005/0040356 A1* | 2/2005 | Uemura et al. ......... 251/129.15 |

* cited by examiner

*Primary Examiner*—J. Casimer Jacyna
(74) *Attorney, Agent, or Firm*—Ladas & Parry LLP

(57) ABSTRACT

Disclosed herein is a solenoid valve having a valve seat assembly manufactured as a single body such that the valve seat assembly is simply fitted in a valve housing. The valve seat assembly comprises a valve seat, a filter, and a sealing plate. The valve seat assembly is disposed at one end of a housing. The valve seat comprises a first orifice formed such that the first orifice is opened and closed as a plunger is moved forward and backward, and a second orifice formed such that the second orifice is arranged in parallel with the first orifice. The sealing plate is provided at the center thereof with a through-hole, which communicates with the first orifice of the valve seat. The sealing plate is disposed in the valve seat such that the sealing plate is not separated from the valve seat by means of the filter. The sealing plate is moved toward the first orifice by the pressure of a fluid close the second orifice. In this way, the sealing plate serves as a check valve.

5 Claims, 6 Drawing Sheets

SOLENOID VALVE

BACKGROUND OF THE INVENTION

1. Field of the Invention

The present invention relates to a solenoid valve, and, more particularly, to a normal open type solenoid valve applicable to an electronically controllable brake system for vehicles.

2. Description of the Related Art

FIG. 1 is a longitudinal sectional view showing the structure of a conventional normal open type solenoid valve 10, which is applied to an electronically controllable brake system for vehicles. As is shown in FIG. 1, the conventional normal open type solenoid valve 10 is operated to constantly open a flow channel when a vehicle is normally braked. When a driver steps on a brake pedal 11a, oil supplied from a master cylinder 11 is delivered to a wheel 12 of the vehicle via a filter 1, an orifice 2a formed at a valve seat 2, and a hollow part 3a and a communication hole 3b formed at a housing 3, by which the vehicle is braked.

When the vehicle is suddenly braked or braked on a slippery road, on the other hand, an electronic control system is operated such that electric current is supplied to a solenoid coil 4. When electric current is supplied to the solenoid coil 4, a magnetic force is generated between an armature 5 and the housing 3 by means of a magnetic field created at the solenoid coil 4 with the result that the armature 5 moves toward the housing 3. Consequently, a plunger 6 moves toward the valve seat 2 along with the armature 5, by which the orifice 2a is closed.

When electric current is not supplied to the solenoid coil 4, the plunger 6 and the armature 5 move back to their original positions by means of a resilient force of a restoring spring 7 such that the orifice 2a is opened. The above-described operations are repeatedly carried out to prevent slippage of the vehicle.

When the driver lifts his/her foot from the brake pedal 11a, the oil is returned from the wheel 12 to the master cylinder 11 via the communication hole 3b, the orifice 2a, and the filter 1, since the oil pressure at the wheel side is higher than that at the master cylinder side. As a result, the oil pressure at the wheel side is released, and thus the brake is released.

The return of the oil must be accomplished as soon as possible after the brake is released such that the wheel 12 is smoothly rotated. In the conventional solenoid valve 10, however, the diameter of the orifice 2a is small. As a result, the return of the oil via the orifice 2a is slow, and thus the oil pressure at the wheel side is not quickly released.

Especially when the orifice 2a is intermittently opened and closed as the electronic control system is operated to prevent slippage of the vehicle, the orifice 2a may be kept closed after the brake is released. For this reason, the conventional solenoid valve 10 further comprises an additional oil return channel and a check valve 8 in addition to the return of oil via the orifice 2a. The check valve 8 has a lip seal 8a, by which the oil is delivered from the wheel side to the master cylinder side. However, the lip seal 8a has a low durability, and the lip seal 8a may be easily deformed by abrupt fluctuation in pressure. Consequently, reliability of the conventional solenoid valve 10 with the above-stated construction is very low.

SUMMARY OF THE INVENTION

Therefore, it is an aspect of the invention to provide a solenoid valve having a valve seat assembly serving as not only a check valve but also a filter, which is manufactured as a single body and thus simply assembled in a valve housing.

In accordance with one aspect, the present invention provides a solenoid valve comprising: a hollow housing having a communication hole formed in the lateral direction thereof; a moving unit disposed at a first end of the housing such that the moving unit is moved forward and backward; and an operating unit to move the moving unit forward and backward, wherein the solenoid valve further comprises: a valve seat assembly disposed at a second end of the housing, the valve seat assembly comprising a valve seat and a filter, the valve seat and the filter being assembled as a single body.

The valve seat comprises: a first orifice formed such that the first orifice is opened and closed as the moving unit is moved forward and backward; and a second orifice formed such that the second orifice is arranged in parallel with the first orifice.

The solenoid valve further comprises: a sealing plate disposed between the valve seat and the filter such that the sealing plate is moved forward and backward.

The sealing plate is provided at the center thereof with a through-hole communicating with the first orifice. The sealing plate closes the second orifice of the valve seat when fluid flows from the second end of the housing to the communication hole of the housing, and the sealing plate opens the second orifice of the valve seat when fluid flows from the communication hole of the housing to the second end of the housing.

The solenoid valve further comprises: a filter-locating part disposed in the valve seat having one side opposite to the moving unit and the other side opposite to the filter-locating part such that the sealing plate is not separated from the filter-locating part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
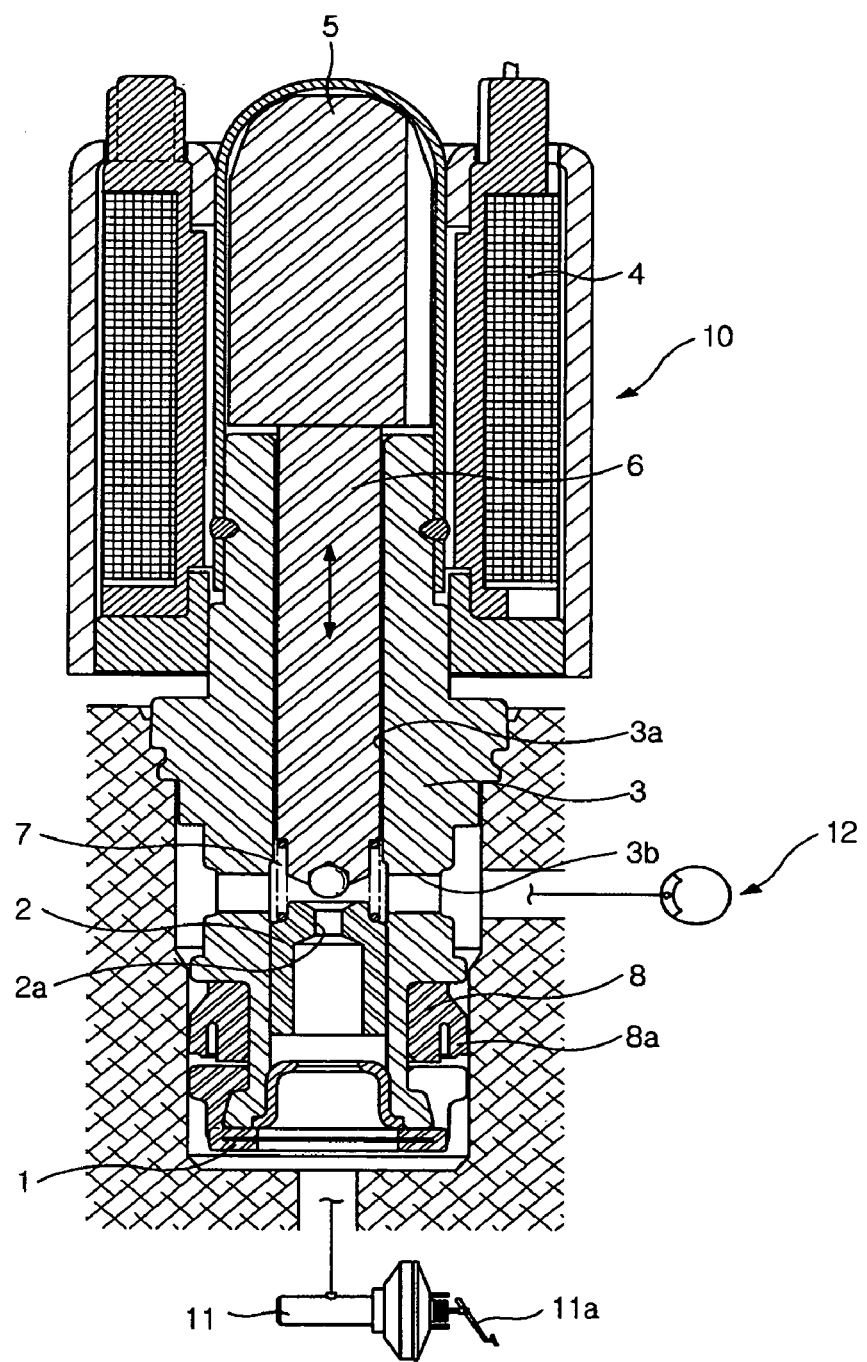
FIG. 1 is a longitudinal sectional view showing a conventional solenoid valve.

Reference will now be made in detail to the embodiment of the present invention, examples of which are illustrated in the accompanying drawings, wherein like reference numerals refer to like elements throughout. The embodiment is described below to explain the present invention by referring to the figures.

Figure 2:
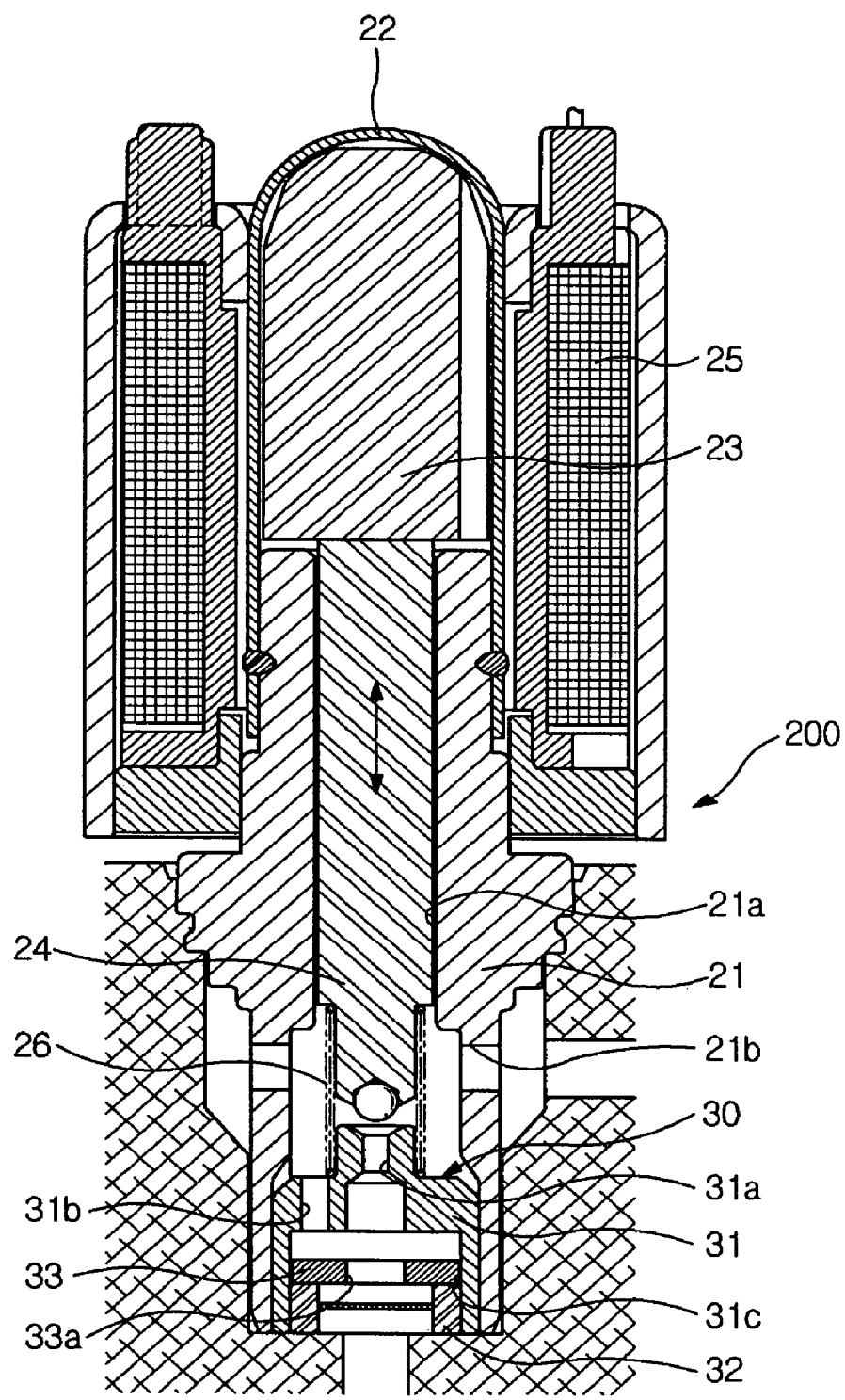
FIG. 2 is a longitudinal sectional view showing a solenoid valve according to the present invention.

FIG. 2 is a longitudinal sectional view showing a solenoid valve 200 according to the present invention. As is shown in FIG. 2, the solenoid valve 200 comprises: a housing 21 having a hollow part 21a formed in the longitudinal direction thereof and a communication hole 21b formed in the lateral direction thereof, the communication hole 21b communicating with the hollow part 21a; a moving unit disposed at a first step (the upper part of the housing in FIG. 2) of the housing 21; an operating unit that moves the moving unit forward and backward; and a valve seat assembly 30 fixedly fitted in the hollow part 21a at a second step (the lower part of the housing in FIG. 2) of the housing 21.

The moving unit comprises: an armature 23 that moves forward and backward in a dome-shaped cap 22 that closes the first step of the housing 21; and a plunger 24 disposed in the hollow part 21a of the housing 21 such that the plunger 24 can move forward and backward along with the armature 23. The operating unit comprises: a solenoid coil 25 disposed at the outside of the cap 22 for generating a magnetic force when electric current is supplied to the solenoid coil 25; and a restoring spring 26 disposed between the plunger 24 and the valve seat assembly 30 for applying a resilient force to the armature 23 and the plunger 24 such that the armature 23 and the plunger 24 is pushed toward the first step of the housing 21.

The valve seat assembly 30 comprises: a valve seat 31 disposed at the second step of the housing 21 while one side of the valve seat 31 is opposite to the plunger 24; a filter 32 disposed while being opposite to the other side of the valve seat 31 for filtering foreign substances from oil; and a sealing plate 33 disposed between the valve seat 31 and the filter 32 such that the sealing plate 33 is moved forward and backward to serve as a check valve.

The valve seat 31, which is approximately formed in the shape of a cylinder, comprises: a first orifice 31a formed at the center of the valve seat 31 in the axial direction thereof such that the first orifice 31a can be opened and closed by means of the plunger 24; a second orifice 31b formed at the outside of the first orifice 31a in the axial direction thereof such that the second orifice 31b is arranged in parallel with the first orifice 31a; and a filter-locating part 31c disposed in the valve seat 31, the filter-locating part 31c having a diameter greater than those of the first and second orifices 31a and 31b.

The sealing plate 33, which is approximately formed in the shape of a disk, has a size slightly less than the diameter of the filter-locating part 31c. The sealing plate 33 is disposed in the filter-locating part 31c such that the sealing plate 33 is not separated from the filter-locating part 31c by means of the filter 32. The sealing plate 33 is movable as fluid flows. The sealing plate 33 is provided at the center thereof with a through-hole 33a, which communicates with the first orifice 31a of the valve seat 31.

When fluid flows from the second step of the housing 21 toward the communication hole 21b of the housing 21, the sealing plate 33 is moved toward the first and second orifices 31a and 31b by the flow pressure of the fluid. As a result, the second orifice 31b is closed. When fluid flows from the communication hole 21b of the housing 21 toward the second step of the housing 21, on the other hand, the sealing plate 33 is moved toward the filter 32 by the flow pressure of the fluid. As a result, the second orifice 31b is opened. In this way, the sealing plate 33 serves as a check valve.

The valve seat assembly 30 with the above-stated construction is assembled as follows: The disk-shaped sealing plate 33 is placed in the filter-locating part 31c of the valve seat 31, and then the filter 32 is fitted into the valve seat 31 while being pressed against the end of the filter-locating part 31c. In this way, the valve seat assembly 30 is assembled. The valve seat assembly 30 is fitted into the second step of the housing 21.

Consequently, the valve seat 31, the filter 32, and the sealing plate 33, which constitute the valve seat assembly 30, are assembled as a single body at an auxiliary production line, which is separated from a main production line of the solenoid valve 200, and then the valve seat assembly 30 is fitted in the housing 21 at the main production line of the solenoid valve 200. In this way, the solenoid valve 200 is easily and quickly manufactured.

Now, the operation of the solenoid valve 200 with the above-stated construction according to the present invention will be described in detail with reference to FIGS. 3 to 6.

Figure 3:
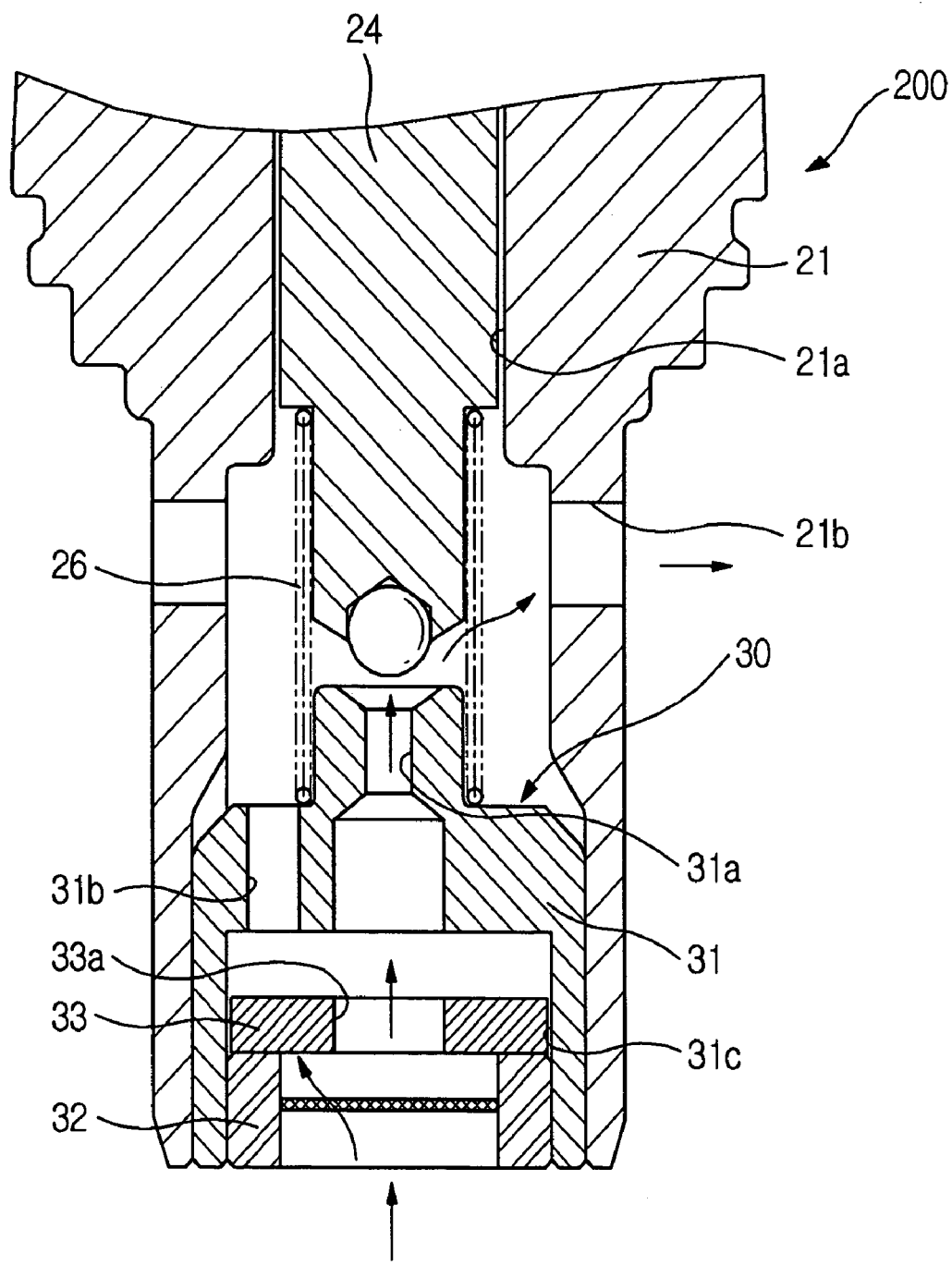
FIGS. 3 and 4 are longitudinal views showing the operation of the solenoid valve according to the present invention when fluid flows from a valve seat assembly to a communication hole of a housing.
Figure 4:
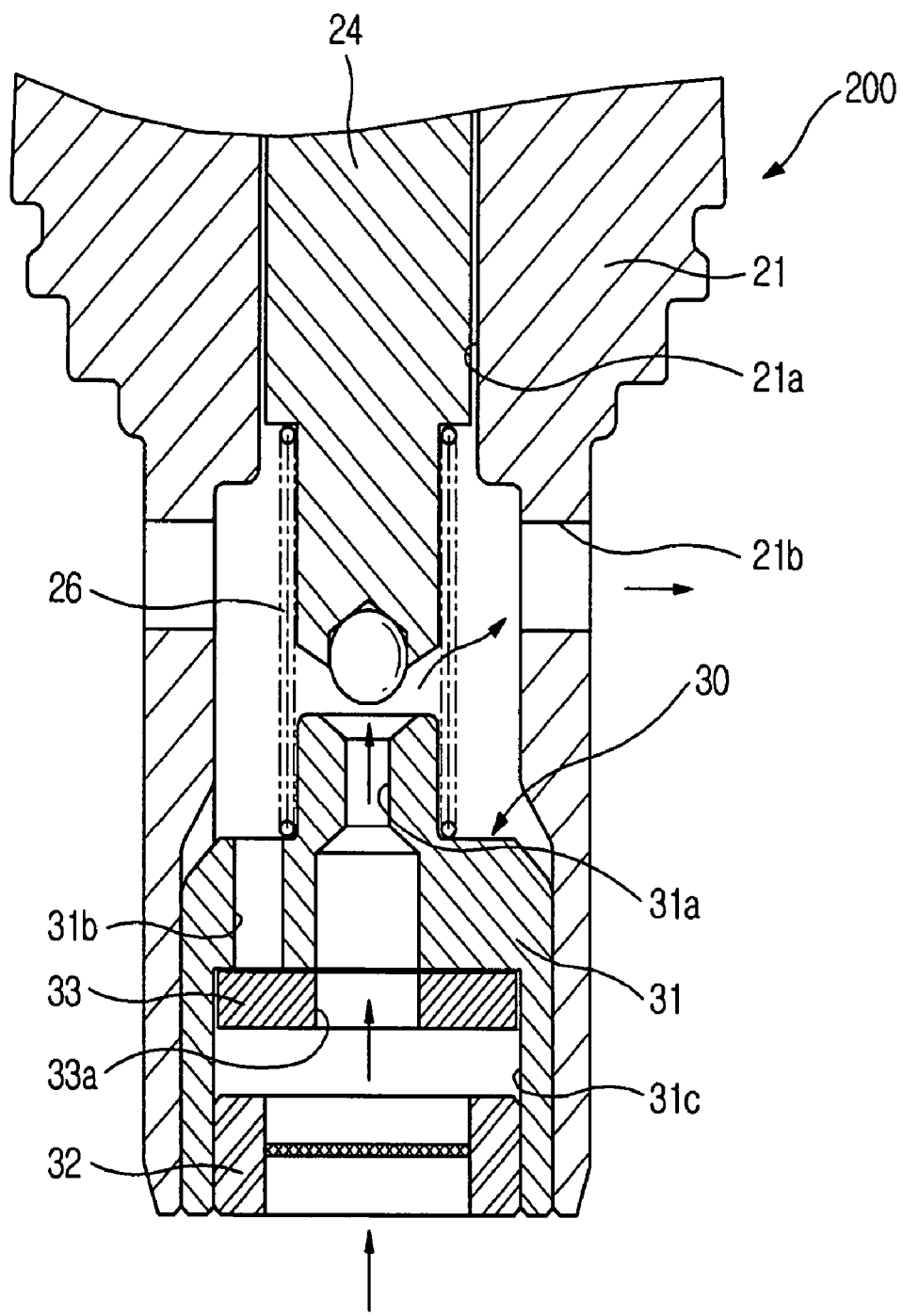
Figure 5:
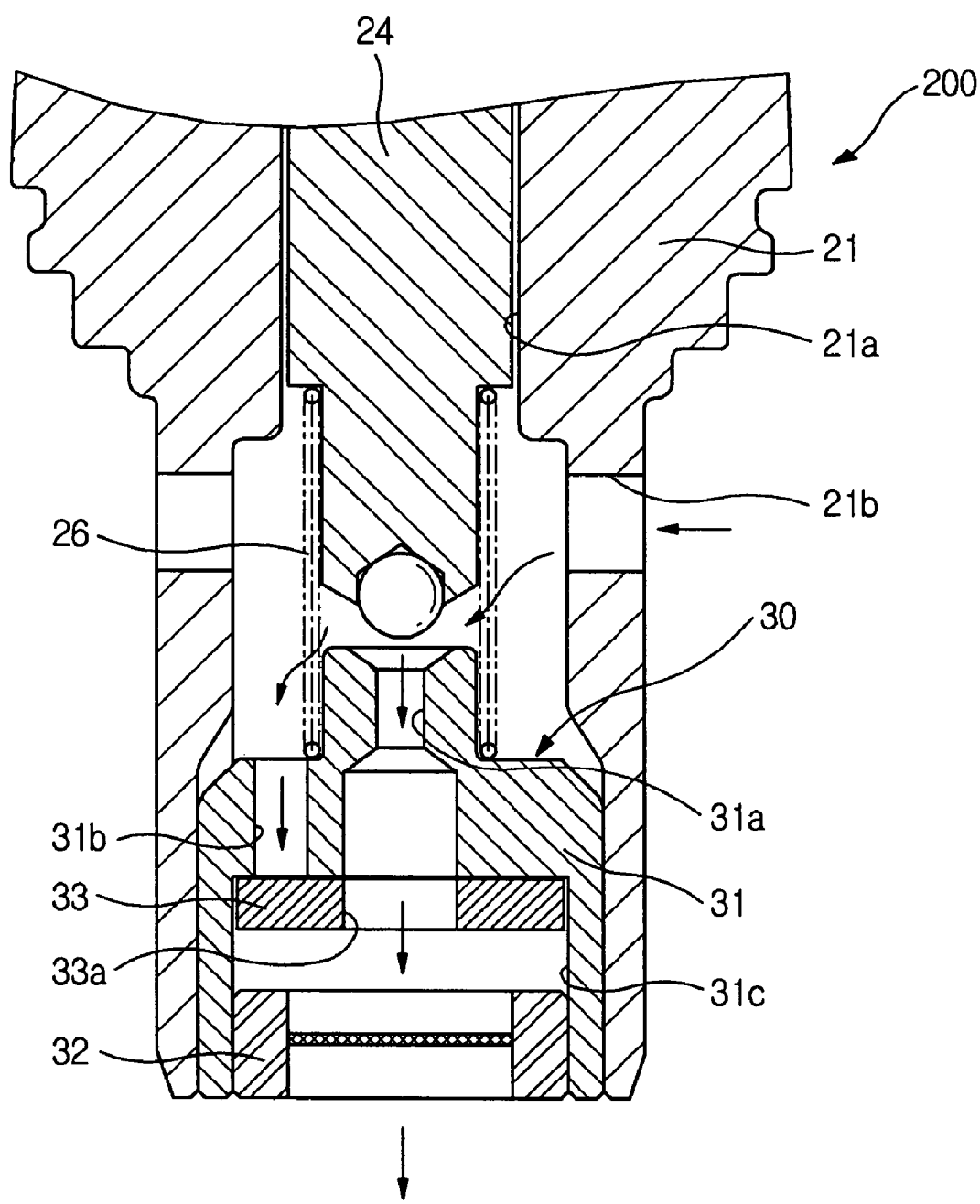
FIGS. 5 and 6 are longitudinal views showing the operation of the solenoid valve according to the present invention when fluid flows from the communication hole of the housing to the valve seat assembly.
Figure 6:
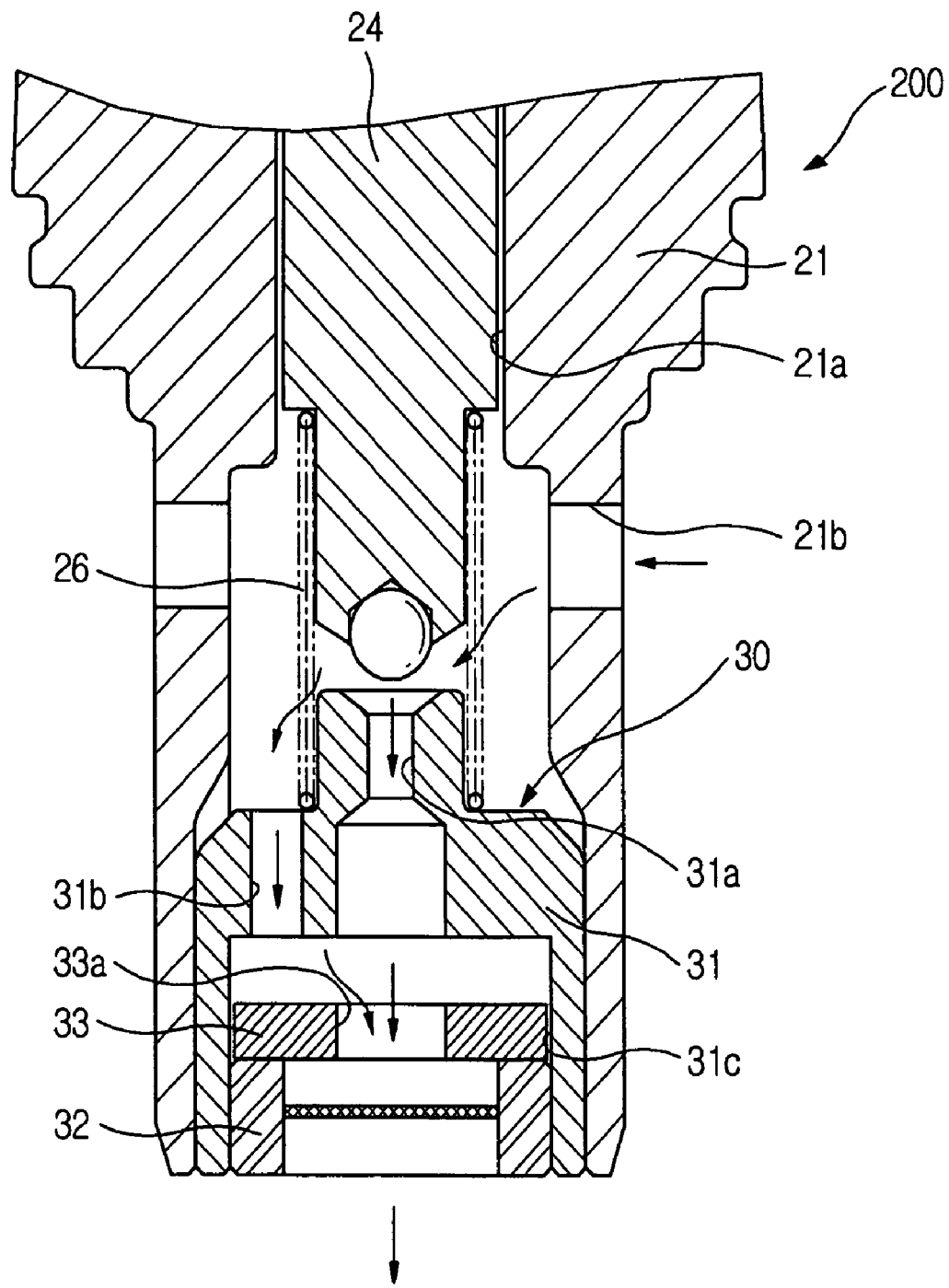

FIGS. 3 and 4 are longitudinal views showing the operation of the solenoid valve according to the present invention when fluid flows from the valve seat assembly to the communication hole of the housing, and FIGS. 5 and 6 are longitudinal views showing the operation of the solenoid valve according to the present invention when fluid flows from the communication hole of the housing to the valve seat assembly.

When a driver steps on a brake pedal (not shown), the oil pressure is created, by which oil is delivered from a master cylinder side (now shown) to a wheel side (not shown) (Refer to FIG. 1). Consequently, the oil is introduced into the valve seat assembly 30 of the solenoid valve 200, as is shown in FIG. 3.

The oil introduced into the valve seat assembly 30 passes through the filter 32, by which foreign substances are separated from the oil. Subsequently, the oil flows through the through-hole 33a of the sealing plate 33, the first orifice 31a of the valve seat 31, and the communication hole 21b of the housing 21.

As the oil flows as described above, oil pressure is applied to the sealing plate 33 such that the sealing plate 33 is moved toward the first and second orifices 31a and 31b of the valve seat 31. As a result, the sealing plate 33 is moved away from the filter 32 in the filter-locating part 31c. Consequently, the first orifice 31a communicates with the through-hole 33a of the sealing plate 33 while the second orifice 31b is closed by the sealing plate 33.

When the driver lifts his/her foot from the brake pedal to release the brake, on the other hand, oil is delivered from the wheel side to the master cylinder side. Consequently, the oil is introduced into the solenoid valve 200 through the communication hole 21b of the housing 21, as is shown in FIG. 5.

The oil introduced into the communication hole 21b of the housing 21 exits from the solenoid valve 200 via the first orifice 31a of the valve seat 31, the through-hole 33a of the sealing plate 33, and the filter 32.

Some of the oil, which did not pass through the first orifice 31a of the valve seat 31, is introduced into the second orifice 31b formed at the valve seat 31 while being arranged in parallel with the first orifice 31a of the valve seat 31. As a result, the oil pressure is applied to the sealing plate 33 such that the sealing plate 33 is moved toward the filter 32.

By the oil pressure as described above, the sealing plate 33 is moved toward the filter 32 to open the second orifice 31b, as is shown in FIG. 6. Consequently, the oil is quickly returned to the master cylinder side through the second orifice 31b as well as the first orifice 31a.

It should be noted that the additional return channel through the second orifice 31b is stably opened to return the oil not only when the solenoid valve 200 is operated while the first orifice 31a of the valve seat 31 is opened by means of the plunger 24 but also when the first orifice 31a of the valve seat 31 is closed by means of the plunger 24 after the electronic control system is operated to prevent slippage of the vehicle.

As apparent from the above description, the present invention provides a solenoid valve wherein a valve seat assembly comprises a valve seat, a filter, and a sealing plate, which are assembled as a single body at an auxiliary production line to obtain the valve seat assembly, and the valve seat assembly is simply fitted in a valve housing. Consequently, the present invention has the effect that the solenoid valve is easily manufactured.

According to the present invention, the sealing plate, which serves as a check valve, is not separated from the valve seat by means of the filter. Consequently, the solenoid valve according to the present invention is miniaturized.

According to the present invention, the sealing plate is formed in the shape of a disk such that the sealing plate can open or close the second orifice with the result that the sealing plate is not deformed by temperature or pressure of the oil. Consequently, the durability of the solenoid valve is increased. Also, the solenoid valve is very sensitive to the flow of oil. Consequently, the flow of oil is smoothly and quickly controlled.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A solenoid valve comprising:
    a hollow housing having a communication hole formed in the lateral direction thereof;
    a moving unit disposed at a first end of the housing such that the moving unit is moved forward and backward; and
    an operating unit to move the moving unit forward and backward,
    wherein the solenoid valve further comprises:
    a valve seat assembly disposed at a second end of the housing, the valve seat assembly comprising a valve seat and a filter, the valve seat and the filter being assembled as a single body;
    wherein the valve seat comprises:
    a first orifice formed such that the first orifice is opened and closed as the moving unit is moved forward and backward; and
    a second orifice formed such that the second orifice is arranged in parallel with the first orifice; and
    further comprising:
    a sealing plate disposed between the valve seat and the filter such that the sealing plate is moved forward and backward.

2. The valve according to claim 1,
    wherein the sealing plate is provided at the center thereof with a through-hole communicating with the first orifice, and
    wherein the sealing plate closes the second orifice of the valve seat when fluid flows from the second end of the housing to the communication hole of the housing, and the sealing plate opens the second orifice of the valve seat when fluid flows from the communication hole of the housing to the second end of the housing.

3. The valve according to claim 1, further comprising:
    a filter-locating part disposed in the valve seat having one side opposite to the moving unit and the other side opposite to the filter-locating part such that the sealing plate is not separated from the filter-locating part.

4. The valve according to claim 1, wherein the operating unit comprises:
    a solenoid coil that generates a magnetic force; and
    a restoring spring disposed between the moving unit and the valve seat assembly, whereby the operating unit moves the moving unit forward and backward.

5. The valve according to claim 4, wherein the moving unit comprises:
    an armature surrounded by the solenoid coil; and
    a plunger disposed between the armature and the valve seat.

* * * * *